Nov. 9, 1943.  C. MOHNEN ET AL  2,333,808
APPARATUS FOR CHECKING ELECTROMECHANICAL DEVICES
Filed March 21, 1939  5 Sheets-Sheet 1
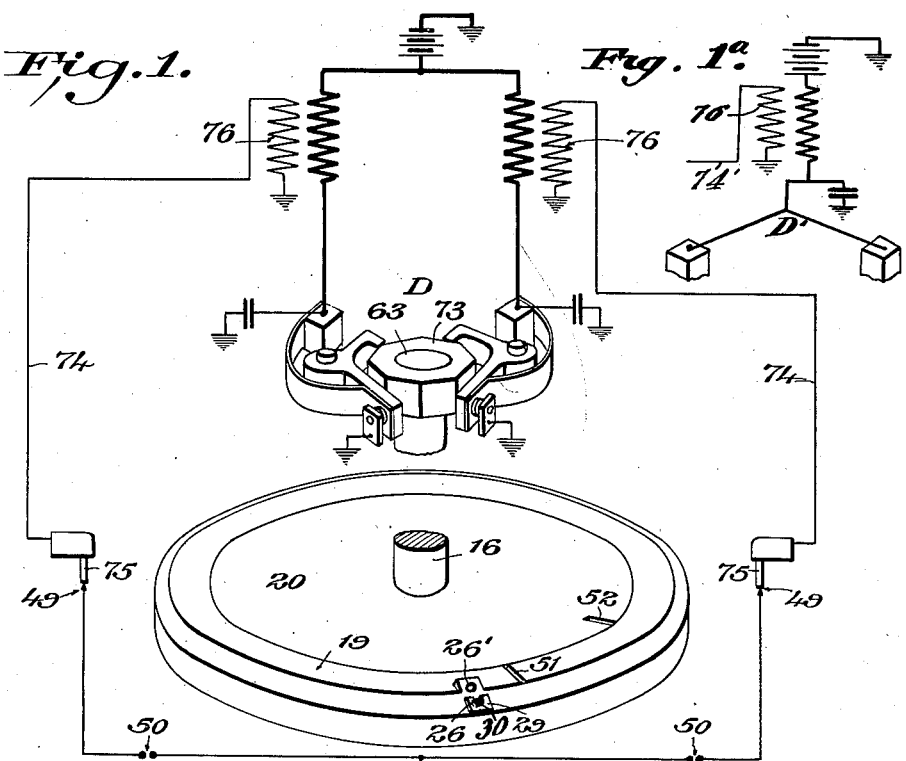
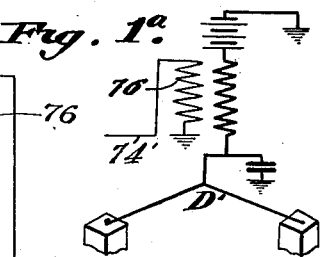
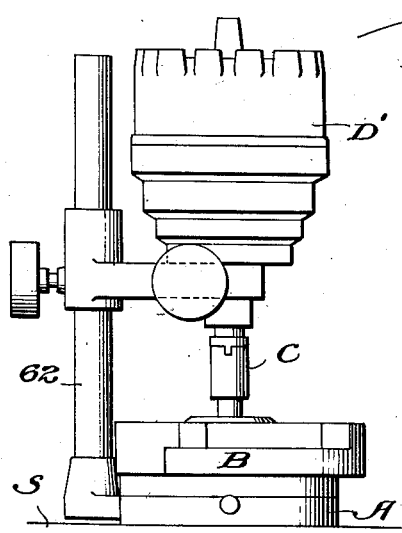
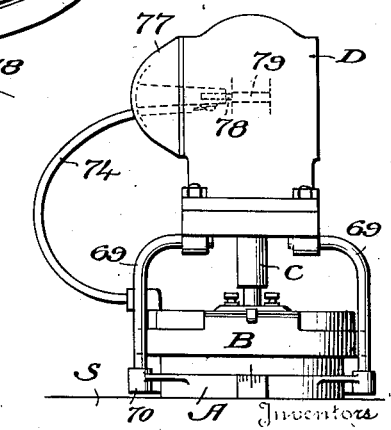
Inventors
Charles Mohnen,
Basil A. Bels,
Benjamin F. W. Heyer,
By Wolhaupter & Groff
Attorneys

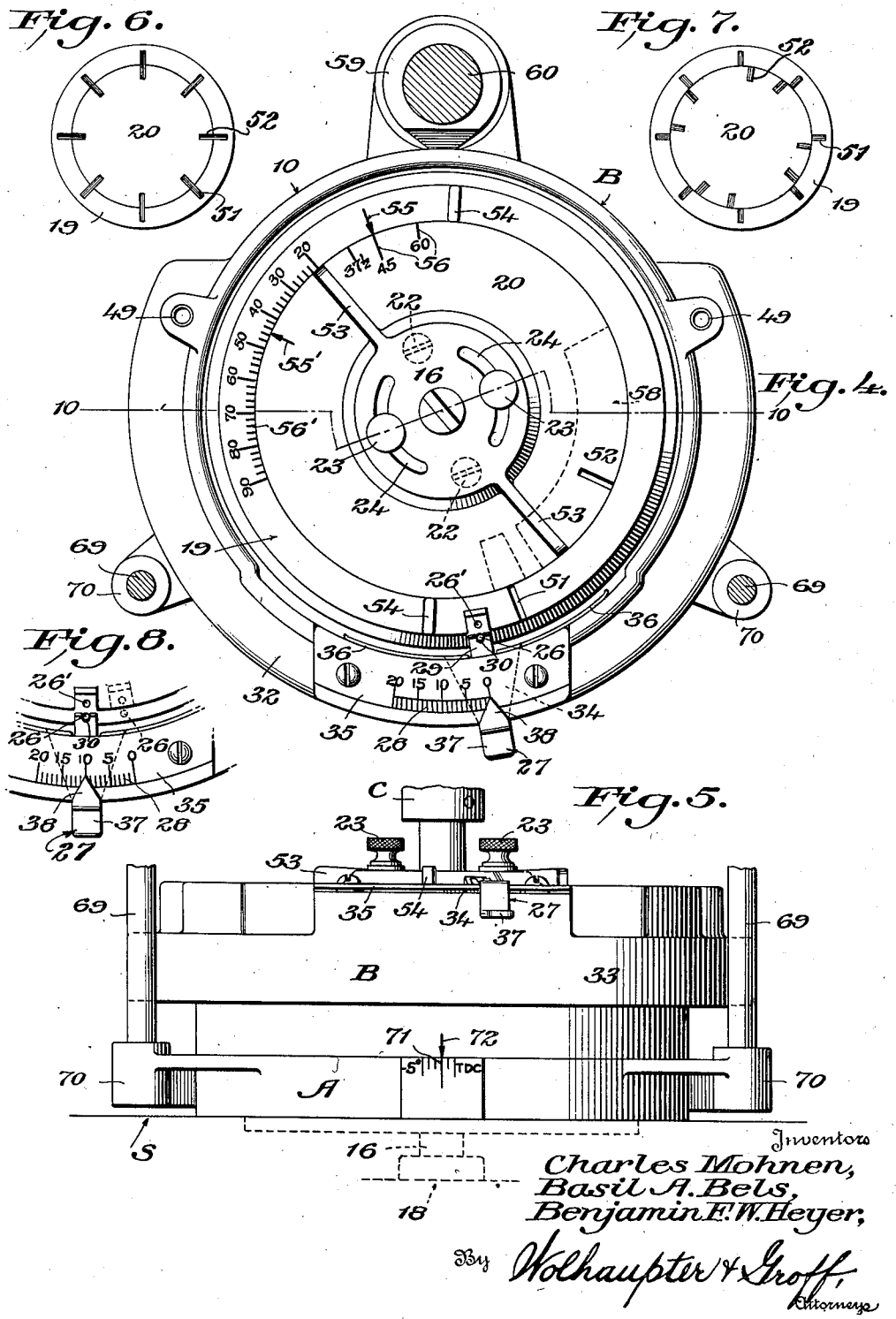

Nov. 9, 1943.     C. MOHNEN ET AL     2,333,808
APPARATUS FOR CHECKING ELECTROMECHANICAL DEVICES
Filed March 21, 1939     5 Sheets-Sheet 3
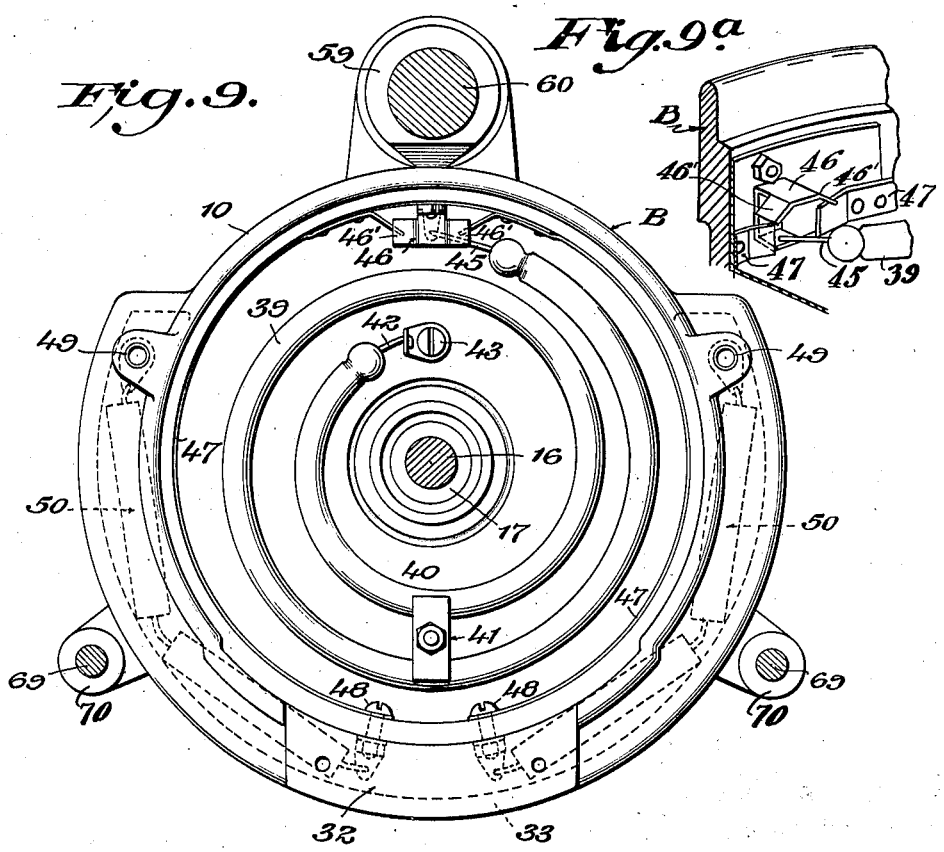
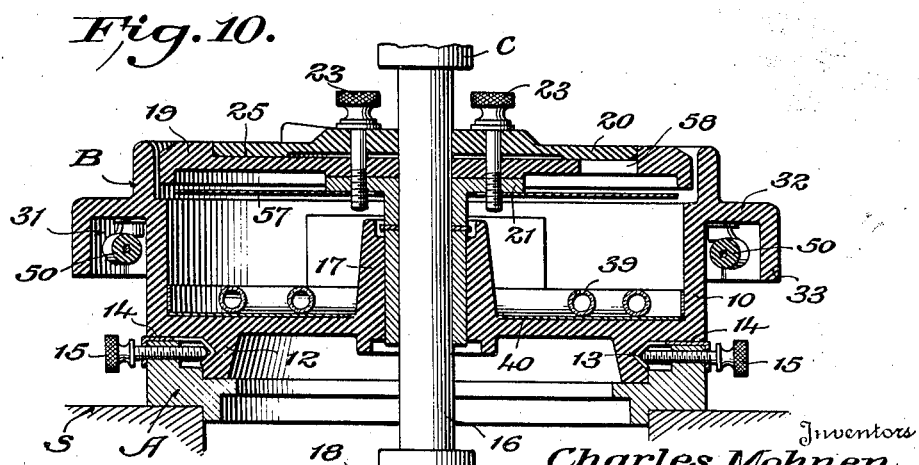
Inventors
Charles Mohnen,
Basil A. Bels,
Benjamin F. W. Heyer;
By Wolhaupter & Groff,
Attorneys

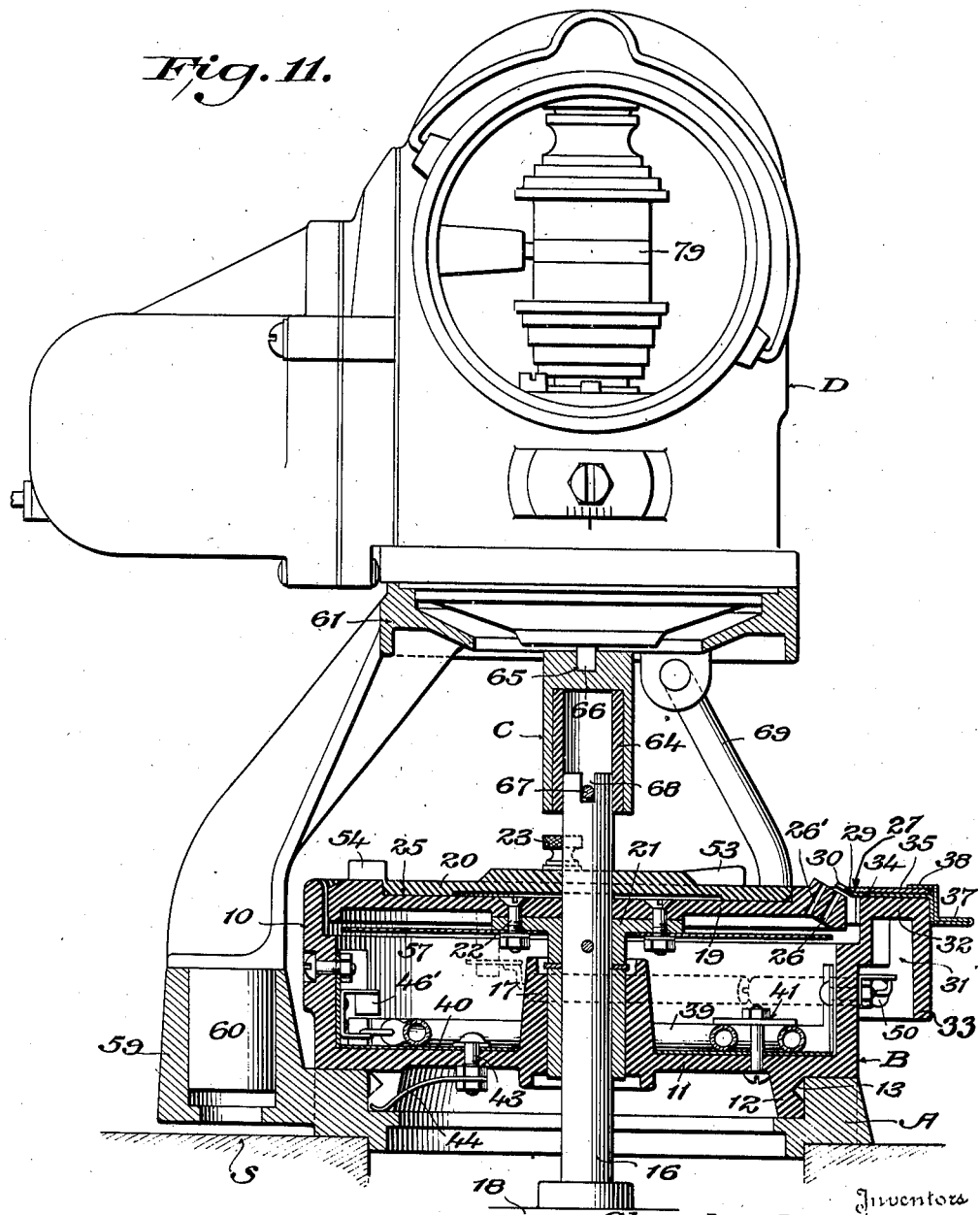

Nov. 9, 1943.                  C. MOHNEN ET AL                    2,333,808
                 APPARATUS FOR CHECKING ELECTROMECHANICAL DEVICES
                     Filed March 21, 1939          5 Sheets-Sheet 5
Fig.12.
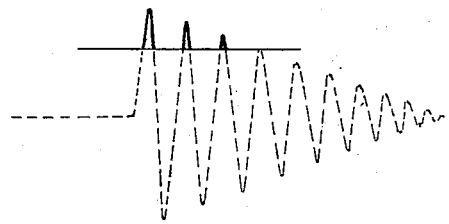
Fig.13.
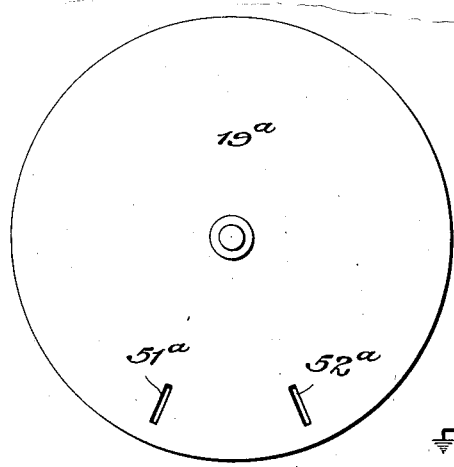
Fig.15.
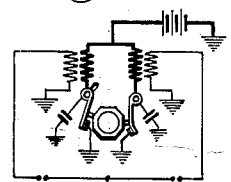
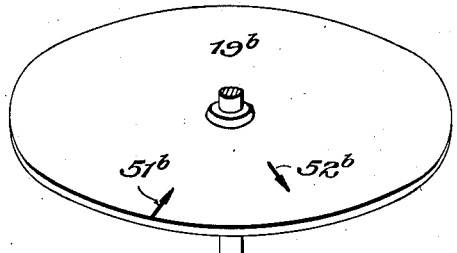
Fig.16.
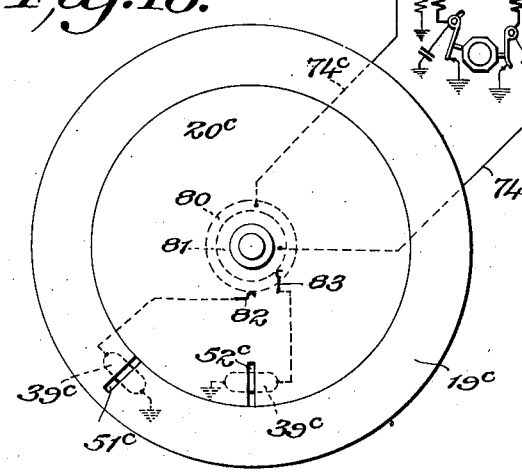
Fig.14.
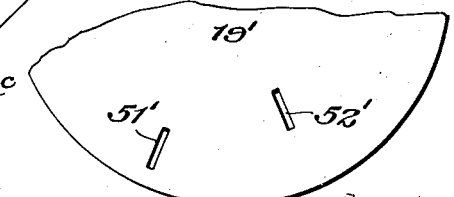
Inventors
Charles Mohnen,
Basil A. Bels,
Benjamin F. W. Heyer,
BY Wolhaupter & Groff
Attorneys Patented Nov. 9, 1943

2,333,808

UNITED STATES PATENT OFFICE 2,333,808

APPARATUS FOR CHECKING ELECTROMECHANICAL DEVICES

Charles Mohnen, Butler, Basil A. Bels, Belleville, and Benjamin F. W. Heyer, Tenafly, N. J., assignors, by direct and mesne assignments, to Knickerbocker Development Corporation, Belleville, N. J., a corporation of Delaware Application March 21, 1939, Serial No. 263,312

5 Claims. (Cl. 177—311)

This invention relates to an improved apparatus having special utility in determining the correctness or accuracy of the functioning of the timer contacts of internal combustion engine ignition systems, but capable of other analogous uses.

A general object of the invention is to provide means for visually indicating and detecting inaccuracies in the time of circuit closing and opening operation of the contacts of internal combustion engine ignition systems by merely observing a visual image, or in some cases by merely comparing several visual images thereby reducing and limiting the inspection and testing procedure to its simplest and most elementary form so that even in unskilled hands the correction procedure can be quickly and accurately performed. That is to say, a distinctive object of the invention is to provide novel means, based on the persistence of vision as a physiological phenomenon, and operable on the principle of the stroboscope for visually indicating the correctness or incorrectness of firing instant in an internal combustion engine. In that connection, the invention, in one of its phases, utilizes two indicators on a rotating member or disc synchronized with means for producing successive light flashes caused by timer controlled energy from a spark coil, and which indicators in themselves constitute the primary guide for correction. These indicators may be in the form of openings through which light may be emitted, or on the other hand they may be in the form of lines on the surface of a rotating member. In all cases, however, the indicators have a predetermined relationship. In some cases this relationship may be permanently fixed as, for example, when the indicators consist of lines or marks on the surface of a single rotating member, or, alternatively, said indicators may be adjustable, one relative to the other when carried by separate discs having a common axis. Regardless, however, of the type of indicators employed, they are animated by a source of light. That is, they are given life or animation which enables their perception by persistence of vision to determine the correctness or incorrectness of the intervals of the flashes produced by the light source.

More specifically, the invention relates to apparatus for use in checking timers of internal combustion engine ignition systems to ascertain whether the same are properly timed and synchronized, and to serve as a guide in adjusting and repairing the same to correct for improper timing and lack of synchronism. In testing for synchronism and lack of synchronism, an important feature of the invention resides in the provision of means which does not require the operator to resort to a scale or the like in reading the visual indications which show synchronism or lack of synchronsim, thereby eliminating the necessity of mathematical calculations with the consequent possibility of error.

A further object of the invention is to provide a device which is simple in construction, rugged and of low production cost, and which, at the same time, is thoroughly reliable and highly efficient in operation.

With the foregoing and other objects in view, which will become more fully apparent as the nature of the invention is better understood, the same consists in apparatus embodying the novel features of construction, combination and arrangement of parts as will be hereinafter more fully described, illustrated in the accompanying drawings and defined in the appended claims.

In the accompanying drawings, wherein like characters of reference denote corresponding parts in related views:

Figure 1 is a diagrammatic perspective view of one practical form of the invention and of a timer of the two spark coil type to be checked thereby.

Figure 1a is a fragmentary view similar to Fig. 1 illustrating a timer of the single spark coil type.

Figure 2 is a side elevation of the form of the invention illustrated in Figure 1, showing one means for mounting a timer to be checked in operative relationship thereto.

Figure 3 is a front elevation of the form of the invention illustrated in Fig. 1 and showing a different means of mounting a different type of timer to be checked in operative relationship thereto.

Figure 4 is a detail top plan view of the form of the invention illustrated in Fig. 1.

Figure 5 is a detail front elevation of the form of the invention illustrated in Fig. 1.

Figure 6 is a diagrammatic view illustrating the indications produced by the apparatus when the timer being checked for synchronism is synchronized.

Figure 7 is a diagrammatic view illustrative of the indications produced by the apparatus when the timer being checked for synchronism lacks synchronism.

Figure 8 is a detail view illustrating, as compared with Fig. 4, a different position of an element of the apparatus used for checking timing of a timer.

Figure 9 is a plan view of the apparatus with top portions thereof removed.

Figure 9a is a perspective view of a portion of the apparatus illustrating a spark gap resistance feature thereof.

Figure 10 is a section on the line 10—10 of Fig. 4.

Figure 11 is a section at right angles to Fig. 10 showing a timer of the type illustrated in Fig. 3 operatively mounted relative to the apparatus.

Figure 12 is a diagrammatic view illustrating that a sharp, quick flash of light is obtained whenever the circuit of the lamp, comprising part of the apparatus, is closed by operation of the breaker points of a timer being tested.

Figures 13 and 14 are plan views illustrating alternative forms of a part of the apparatus.

Figure 15 is a diagrammatic perspective view illustrating an alternative form of the apparatus; and Figure 16 is a diagrammatic plan view illustrating another alternative form of the apparatus.

Referring to the drawings in detail, A designates generally the base of the present testing apparatus and B designates, generally, a casing supported by said base for rotative adjustment relative thereto.

The base A preferably is formed from metal and is of ring-like form and may be mounted upon any suitable support, such as indicated at S, in any suitable manner.

The casing B, which may appropriately be molded from a suitable plastic material is of substantially cylindrical, open-top, closed bottom form and includes a side wall 10 and a bottom wall 11, which latter is marginally seated upon the top of the base A and has a depending flange 12 closely fitting within said base. Said casing thereby is held against lateral movement relative to the base A, but is rotatably adjustable relative thereto.

Any suitable means may be provided to retain the casing B in assembly with the base A and to secure said casing in any desired position of rotative adjustment relative to said base. In the present instance the flange 12 is provided with an exterior, annular V-shaped groove 13 and the base A is provided with a pair of slide pieces 14 to be projected into said groove, each by a related screw 15 threaded into the base. The slide pieces have V-shaped inner ends to fit the groove 13, and when said ends are disposed in said groove the casing B is held in assembly with the base A. By loosening the screws 15 the casing is free to be rotatably adjusted relative to the base; while by tightening said screws 15 the slide pieces are caused to clampingly engage the flange 12 to secure the casing in any rotatably adjusted position relative to the base.

Extending axially through the casing B is a shaft 16 which is journaled for rotation in a bearing 17 carried by the bottom wall 11 of said casing and which extends below said casing through the base A and at its lower end has connected thereto a motor 18 for driving the same.

Fixed in any suitable manner to the shaft 16 for rotation therewith is a disk 19 which serves as a closure for the open top of the casing B and which has mounted in any suitable manner upon the top thereof, for rotative adjustment relative thereto, a companion, smaller disk 20.

As in the case of the casing B, the disks 19 and 20 may also appropriately be molded from suitable material. In that event, in order to fasten the disk 19 to the shaft 16, said shaft may have fixed thereto a metal, disk-like element 21 and said disk 19 may be secured to said element 21 by rivets, screws or other suitable fasteners 22. Similarly, in order to provide for securing the disk 20 in different rotatively adjusted positions relative to the disk 19, one or more clamping screws 23 may be extended through one or more arcuate slots 24 provided in said disk 20 and may be threaded into the element 21. By loosening the clamping screw, or screws, 23, the disk 20 may be rotatably adjusted relative to the disk 19, while by tightening said clamping screw, or screws, said disk 20 may be clamped to said disk 19 for unitary rotation therewith.

Preferably, but not necessarily, the disk 19 is provided with a top recess 25 to accommodate the disk 20, thereby to provide for disposition of the top, marginal surface of the disk 20 flush with or in the same plane as the top marginal surface of the disk 19.

Formed through a marginal portion of the disk 19, at a downward and inward inclination relative thereto, is a small opening 26; while mounted on the casing B for circumferential adjustment relative thereto is a sight element 27 for cooperation with said opening 26 and also for cooperation with a suitable scale 28 (Figs. 4 and 8) provided on said casing.

In the present instance the sight element 27 includes a tongue 29 overlying the marginal portion of the disk 19 and having therein a small slot or opening 30 with which the opening 26 alines whenever, by rotation of the disk 19, its opening passes beneath said tongue 29.

The casing B includes in the present instance, throughout a portion of its circumferential extent, a closed-top, open-bottom conductor-accommodating channel 31 (Figs. 10 and 11), the inner side of which is defined by the casing side wall 10, the top of which is defined by a wall 32 extending outwardly from the top of the side wall 10, and the outer side of which is defined by a wall 33 (Figs. 9 to 11) extending downwardly from the top wall 32 in spaced relationship to the casing side wall 10.

In the present instance the sight element 27 (Figs. 4, 5, 8 and 11) includes a plate-like portion 34 which overlies the wall 32 and which is confined beneath a plate 35 which is fastened to said wall 32 and which carries the scale 28. At its inner end, the plate-like portion 34 carries the tongue 29 and also spring fingers 36 which engage the inner face of the casing side wall 10; while at its outer end the said plate-like portion 34 is extended first downwardly against the outer face of the wall 33 thence laterally outwardly and upwardly and inwardly upon itself to provide a handle 37, and thence upwardly and then inwardly over the plate 35 in the form of an index or pointer 38 for cooperation with the scale 28 on said plate 35. By means of the handle 37 the sight element 27 may readily be adjusted circumferentially of the casing B, while due to the spring fingers 36 pressing against the inner face of the wall 10, said sight element will be retained in any adjusted position in which it may be placed.

Within the casing B is suitably mounted an electric lamp 39 (Figs. 9 and 10) of a type which flashes quickly responsive to closing of a circuit therethrough. Appropriately, this lamp may comprise a neon tube and appropriately said tube may be bent into circular shape or may be helically coiled so as to extend entirely, or substantially entirely around the interior of the casing B. Thus, whenever said lamp is flashed, it completely illuminates all portions of the interior of said casing.

In the present instance the lamp 39, in the form of a flat, spirally wound neon tube, is disposed at the bottom of the casing B upon a light reflecting disk 40 and is fixedly secured within said casing by clamping means designated as 41.

From one terminal of the lamp 39 a conductor 42 leads to and is connected with a bolt 43 (Figs. 9 and 11) which extends through the bottom wall 11 of the casing B and serves to secure thereto a spring finger 44 which contacts with the metallic base A when the casing B is operatively mounted thereon. The base A is suitably grounded and, therefore, one terminal of the lamp 39 is grounded.

From the other terminal of the lamp 39 a conductor 45 leads to and is connected with a conductor element 46. This conductor element includes terminal portions 46' spaced, as shown in Figs. 9a and 11, predetermined amounts from the adjacent ends of a pair of conductor strips 47, 47 which extend circumferentially of the casing B to related fastening screws 48. A pair of metallic tubes 49, 49 which serve as sockets to accommodate circuit continuing jacks, are embedded in enlargements of the side wall 10 of the casing B at points to render them conveniently accessible and are respectively connected with the fastening screws 48 through resistors 50 disposed in the channel 31.

In the disk 19, outwardly of the disk 20, is a narrow, radial slot 51 (Fig. 4) of any suitable length which extends inwardly to the periphery of said disk 20, while in the disk 20 is a cooperating radial slot 52 of preferably the same width and length as the slot 51 and which opens at its outer end through the periphery of said disk 20.

To facilitate rotative adjustments of the disk 20 relative to the disk 19 said disks may be provided with upstanding ribs 53 and lugs 54, respectively, while in order to indicate certain definite angularly spaced relationships of the slots 51 and 52 obtained by rotatably adjusting the disk 20 relative to the disk 19, one of said disks is provided with an index 55 and the other is provided with indices 56 for alinement with said index 55.

Suitably mounted below the disk 19 and above the lamp 39, as, for example, upon the element 21 by the screws 22, is a thin disk 57 (Figs. 10 and 11) of suitably colored, translucent material so that whenever the lamp 39 is flashed the flash is vividly visible through the opening 26 and through the slots 51 and 52. In this connection, in order that light within the casing B may be visible through the opening 52 in the disk 20 in any operative rotated position of adjustment of said disk 20 relative to the disk 19, the portion of the disk 19 over which the slot 52 travels when the disk 20 is rotatively adjusted relative to the disk 19, is provided with an arcuate slot 58.

Although not essential, there preferably is formed through the disk 19, adjacent to and inwardly of the opening 26 and in the same radial plane as said opening 26, a companion opening 26' (Figs. 4, 8 and 11) which is disposed inwardly of the tongue 29. Thus, while lamp flashes occurring when the opening 26 is covered by any part of the tongue 29, would not be visible through said opening 26, they are always visible through the opening 26'.

The base A includes a socket 59 to receive either the stem 60 of a bracket 61 for supporting a distributor D of a certain type, as illustrated in Figures 3 and 11, or to receive a rod 62 for supporting a distributor D' of another type, as illustrated in Fig. 2. In either case, the distributor is supported above the testing apparatus in axial alinement with the shaft 16 and a driving connection between said shaft 16 and the cam shaft 63 of the distributor is effected by a coupling C (Fig. 11), having universal joint characteristics.

The coupling C is in the form of a tube of greater internal diameter than the shaft 16 and contains a lining 64 of rubber or other soft, pliable material having an internal diameter corresponding substantially to the diameter of the upper end portion of the shaft 16. Preferably said coupling is closed at its upper end, but this is not essential. In any event, said coupling is provided with a transverse slot 65 which opens through its upper end and which is of a width and depth to receive a transverse lug 66 which usually is provided on the lower end of the cam shaft 63 (Fig. 1) of a certain type of timer for the purpose of keying said timer cam shaft to its driving shaft when the timer is mounted on an engine. Moreover, said coupling is provided near its lower end with a transverse pin 67 to enter a transverse slot 68 provided in the upper end of the shaft 16 to connect said coupling to said shaft for rotation therewith when the coupling is operatively applied to said shaft.

The coupling C is applied to the shaft 16 by engaging its lower end portion over the upper end portion of said shaft and by entering the pin 67 in the slot 68. This is done prior to mounting of the timer D or D' above the testing apparatus. Thereafter, the timer is mounted above the testing apparatus and its cam shaft lug 66 is engaged in the coupling slot 65, the coupling being, of course, of a length to span the space between the adjacent ends of the shafts 16 and 63. The soft lining 64 yields in case of any slight misalinement of said shafts and thereby provides for smooth and free driving of the timer cam shaft by the shaft 16 despite any slight misalinement of said shafts.

Although not essential, the timer supporting bracket 61 preferably is provided with legs 69 and the base A preferably is provided with sockets 70 to receive said legs to assist in mounting said bracket securely upon said base.

On the base A is a circumferentially extending degree scale 71 (Fig. 5) and on the casing B is an index 72 for cooperation with said scale. In this connection, it is pointed out that the lug 66 usually is disposed "off center" a slight amount so that the timer cam shaft can be coupled with its drive shaft in only a single predetermined position of rotation relative thereto. The slot 65 is disposed a corresponding amount "off center." Therefore, it is possible to couple the shaft 16 to the timer cam shaft 63 in one position only. Thus, with each timer tested, the timer cam shaft 63 and cam 73 which operate the contact points, are made to assume the same relative rotative position with respect to shaft 16 as they assume to their drive shaft when the timer is operatively applied to an engine. When the shaft 16 is thus connected by a coupling C with a timer cam shaft a certain definite angular relationship exists between the cam 73 of the timer and the scales 28 and 71. In the present instance these relationships are such that when the casing B is rotatably adjusted relative to the base A to aline the casing index 72 with the 0 indication of the scale 71; when the pointer 38 is alined with the 0 indication of the scale 28, and the sight opening 26 is alined with the sight opening 30 in the tongue 29; the timer cam is positioned corresponding to the position it occupies when the related engine piston is in top dead center position. Accordingly, if, in lieu of conductors leading from the timer to the spark plugs of an engine, as would be the case if the timer were operatively associated with an engine, equivalents of said conductors are connected with the lamp 39, it is apparent (assuming connection with the timer of a suitable source of current in the usual manner) that during a single complete rotation of the disk 19, the lamp 39 will be flashed a number of times corresponding to the number of actuations of the breaker point arms of the timer by the timer cam 73. It is further apparent that if the timer is timed to complete its spark plug circuits at instants corresponding to top dead center positions of the related pistons of the engine on which the timer is to be used, and assuming rotation of the timer cam shaft at a speed sufficiently low so that the automatic spark advancing means of the timer is inoperative, the sight opening 26 will be alined with the sight opening 30 in the tongue 29 when a flash of the lamp 39 occurs; otherwise, the flash will occur when said sight opening 26 is to one side or the other of the tongue opening 30. Due to rotation of the disk 19 and to the physiological phenomenon of persistance of vision, successive flashes will have the appearance of being continuous. Therefore, they may be very easily observed. If they occur when the sight opening is alined with the tongue opening 30 and if the timer is intended to close its spark plug circuits when the pistons of the engine upon which the timer is to be used, are in top dead center positions, the indication of the apparatus is that the timing of the timer is correct. If, on the other hand, the flashes occur when the sight opening 26 is to one side or the other of the tongue opening 30, the apparatus indicates that the timing of the timer is incorrect and requires adjustment. Adjustment is made by the means provided on the timer for that purpose while the apparatus continues to operate the timer, until the flashes occur when the sight opening 26 is alined with the tongue opening 30. The timing then is correct and the adjustment means of the timer is secured in its adjusted position.

In testing a timer which is intended to close its spark plug circuits at times corresponding to one, two, three or more degrees before the engine pistons reach top dead center positions, as usually is the case, the casing B is rotatively adjusted relative to the base A and a corresponding number of degrees as indicated by the scale 71 and the index 72. This results in shifting the tongue opening 30 a corresponding number of degrees so that, when the timing of the timer is correct, flashings of the lamp 39 will occur when the sight opening 26 is alined with the tongue opening 30. If the flashes occur when the sight opening is to one side or the other of the tongue opening 30, still assuming that the timer cam shaft is rotated at a speed below which its automatic spark advancing means becomes operative, the indication is that the timing is incorrect and requires adjustment, and adjustment is made until the flashes occur when the sight opening is alined with the tongue opening 30.

Timers that are constructed to be automatically advanced with increase in speed of the engines upon which they are used usually include a spring-applied, vacuum-released brake operatively connected with the engine intake manifold, and centrifugally operated means for advancing the cam 73 relative to the timer cam shaft 63. When such a timer is to be tested by the present apparatus, its shaft 63 should, as heretofore indicated, be rotated at a speed below which the automatic advancing means becomes effective, and the brake should be released to permit the timer shaft to rotate freely, although this latter is not essential.

After the timer has been tested and, if required, adjusted for corrections of timing, it is tested for proper adjustment of its vacuum released brake. For any given timer of the automatic spark advance type there should be a definite amount of automatic advance at a given high speed of the engine on which it is used. Accordingly, the speed of the shaft 16 is increased corresponding to the given high speed of the engine and the sight device 27 is shifted an amount, as indicated by the cooperation of the pointer 38 with the scale 28, corresponding to what should be the automatic advance of the timer at such given high speed. Figure 8 illustrates an example of such shifting of the sight device 27. If, then, the flashes occur when the sight opening 26 is alined with the tongue opening 30, the indication is that the adjustment of the vacuum released brake is correct. If the flashes occur when the sight opening 26 is to one side or the other of the tongue opening 30, the indication is that the adjustment of the brake is incorrect. The brake then is adjusted until the flashes occur when the sight opening 26 is alined with the tongue opening 30.

By way of explanation, it may be said that the proper firing interval of all modern automobile engines is worked out on a carefully calibrated curve; that is, for any engine speed and load, there is one specific point at which the spark should occur to produce proper firing. Thus, the speed of shaft 16 can be adjusted to correspond to any desired engine speed and by reference to previously calibrated performance curves, the pointer 38 is set to the proper number of degrees of spark advance on scale 28. Thus, if the timer spark advance mechanism is functioning properly, the opening 26 will align with the slot or opening 30 in the tongue 29. If this alignment does not take place, the operator is aware that the timer timing mechanism is not functioning properly for that specific speed. He is then enabled to make proper adjustments or correct the conditions.

Electrical connections between the high tension side, or sides, of the coil, or coils, of a timer being tested and the lamp 39 may be effected in any suitable manner. In this connection and as illustrated in Fig. 1, conductors 74 are provided with jacks 75 for insertion into the tubes 49; said conductors being connectable in any suitable manner with the high tension side, or sides, 76 of the spark coil, or coils, of the distributor. For example, Fig. 3 illustrates one of the conductors 74 as being equipped with a cap 77 to temporarily replace an ordinary cap of the distributor D; said cap 77 carrying a brush 78 with which the conductor 74 is connected and which, in the applied position of the cap 77, contacts with the distributor ring 79 of the distributor. Figure 1 illustrates a timer D of the two spark coil type while Figure 1ª illustrates a timer D' of the single spark coil type. Both timers are tested in the same manner, the only difference being that only a single conductor 74' is employed in the case of a timer of the single spark coil type while two conductors 74 are employed in the case of a timer of the two spark coil type.

Figure 12 of the drawings illustrates that the resistors 50 serve to eliminate all except the tips of the first three or four waves of an electrical impulse produced by opening of the breaker points of the distributor. The resultant light flash is very quick and sharp, and, therefore, the images produced by the sight opening 26 are not fringed if the distributor is in good working order. Consequently, should the images appear frayed, or be accompanied by phantom images, the indication is that the timer is not in good working order and that repair is required; for example, that a loose, worn or eccentric cam requires replacement.

In making timing and brake adjustment tests no attention is paid to the flashings as they are viewed through the slots 51 and 52. In other words, the position of rotative adjustment of the disk 20 relative to the disk 19 is immaterial so far as concerns tests for timing and brake adjustment. On the other hand, no attention is paid to the flashings as they are viewed through the sight openings 26, 26' when the apparatus is used for testing a timer for synchronism.

In testing a timer for synchronism, the disk 20 is adjusted relative to the disk 19 to obtain the proper angular relationship between the slots 51 and 52 corresponding to the particular type of engine on which the timer is to be used. In other words, if the timer is designed for use on a common type of eight cylinder engine the disk 20 is adjusted relative to the disk 19 to obtain a forty-five degree angular spaced relationship between the slots 51 and 52; if the timer is designed for use on a twelve cylinder engine the disk 20 is adjusted relative to the disk 19 to obtain the desired angular spaced relationship between the slots 51 and 52, and so on for a timer designed for use on an engine having any other number of cylinders, depending on the proper firing interval between the respective cylinders. The indices 55 and 56, and an additional index 55' on one of the disks and a cooperating scale 56' on the other disk afford guide means for use in quickly and accurately obtaining desired relative angular adjustments of the disks 19 and 20.

Some internal combustion engines, notably those of the well known V-type, in effect combine two separate multiple cylinder engines in a single engine. In some such engines it is usual to have, in effect, two separate timers which respectively control the spark plugs of the separate engines and which are combined in a single timer operated by a single cam. In such engines the firing order alternates between the cylinders of the respective engines. Consequently, in order to obtain smooth, efficient engine performance, it is quite essential that the times of firing of the cylinders of the respective engines be equally spaced apart; in other words, that there shall be synchronization as between the firing instants of the cylinders of the respective engines. Figure 1 illustrates diagrammatically by full lines a timer for controlling sparking of the spark plugs of an engine combining, in effect, two separate engines, said timer comprising, as usual, one set of breaker points and an associated spark coil related to the spark plugs of one of the engines, and a second set of breaker points and an associated coil, distinct from the first mentioned coil, related to the spark plugs of the other engine. In a timer of this type one of the sets of breaker points usually is angularly adjustable relative to the other set for synchronizing purposes.

Assuming that the timer to be tested for synchronism is designed for use on a common type eight cylinder engine, the disk 20 is adjusted relative to the disk 19 to obtain an angular spaced relationship between the slots 51 and 52 of forty-five degrees, as illustrated in Fig. 4 of the drawings, and the high tension sides of the two distributor coils are connected, respectively, with the tubes 49. In addition, the timer is connected with a suitable source of current supply. The motor 18 then is started to simultaneously drive the disks 19 and 20 and the cam shaft of the timer. This, of course, results in circuits being closed through the lamp 39 at instants corresponding to actuation of spark plug circuits by the timer, any given flashing of the lamp corresponding to actuation of a spark plug circuit of a cylinder of one bank of the engine cylinders and the next flashing of the lamp corresponding to actuation of a spark plug circuit of a cylinder of the other bank of the engine cylinders. In this connection it is pointed out that, due to the spacing of the terminal portions of the conductor element 46 from the adjacent ends of the conductor strips 47, 47 closing of the lamp circuit under the influence of either set of breaker points and their related spark coil of the timer, does not affect the other spark coil of the timer. In other words, when discharge from either spark coil of the timer occurs, it is sufficiently strong to jump the gap between the conductor element 46 and the adjacent end of the related conductor strip 47, but is not sufficiently strong to overcome the resistance offered by the gap between the conductor element 46 and the other conductor strip 47. Thus, interference of either spark coil of the distributor with proper operation of the other spark coil of the distributor is avoided.

Whenever the lamp 39 is flashed the flash is seen through the slots 51 and 52, and at or above a given speed of rotation of the disks 19 and 20 successive flashings, due to the physiological phenomenon of persistence of vision, will be seen at spaced points entirely around said disks, despite the fact that they actually are seen through the slots 51 and 52 at only two spaced points. In other words, if the flashings occur sufficiently rapidly, the slot defined images of flashes previously occurring will be retained by the eye during succeeding flashes. Thus, if the timer is synchronized, the images defined by the slots 51 will be radially alined with the images defined by the slots 52, as illustrated in Fig. 6 of the drawings, since the flashings occur at forty-five degree intervals and the slots 51 and 52 are spaced forty-five degrees apart. On the other hand, if successive flashes occur at other than forty-five degree intervals, the images defined by the slot 51 obviously will be disalined from the images defined by the slot 52, as illustrated in Fig. 7 of the drawings, thereby indicating that the timer is not synchronized. It then is adjusted by the means provided therein for that purpose to effect its synchronism, the adjustment being made while the apparatus continues to drive the timer. As the adjustment is correctly made the slot-defined images will appear to creep into alinement with each other, which greatly facilitates the adjustment, and when the images become alined the adjustment is correct.

The timers for two or more entirely separate and distinct engines, as for example, the timers of twin or multiple engines used in boats or aircraft, may obviously be checked for synchronism by means of the present apparatus in the same general manner as the timer of a single engine embodying, in effect, two separate engines.

It obviously is not necessary that there be two disks, such as the disks 19 and 20, angularly adjustable relative to each other for synchronism checking purposes. On the contrary, two slots corresponding to the slots 51 and 52 may be provided in a single disk as illustrated in Fig. 14 of the drawings, wherein the single disk is designated as 19' and the two slots therein corresponding to the slots 51 and 52 are designated as 51' and 52', respectively. Different single disks 19' having the slots 51', 52' therein spaced different distances apart, may be used interchangeably in lieu of relatively adjusting the disks 19 and 20. Relatively adjustable disks such as the disks 19 and 20 are, however, preferred to having a plurality of single disks with the slots therein spaced different distances apart, as the apparatus thereby is considerably condensed and there is avoided the necessity of interchanging the single disks, as well as the disadvantages inherent to plural single disks.

Neither is it necessary that angularly spaced slots in a disk or disks be disposed different distances from the center or centers of the disk or disks, as the case may be. On the contrary, the slots may be disposed equal distances from the center or centers of the disk or disks in which they are provided. This is illustrated in Fig. 13 of the drawings, wherein the two angularly spaced slots, designated as 51ª, 52ª are provided in a single disk designated as 19ª at equal distances from the center of said disk. If a disk of this kind is used the images of the respective slots will be superimposed if the timer being tested is synchronized; otherwise, the images of the respective slots will be more or less spaced apart in side to side relationship.

Neither is it necessary that there be slots in the rotatable disk or disks with a lamp beneath or behind the disk or disks. On the contrary, the disk or disks may have on its, or their, top or front face, or faces, as the case may be, simply a pair of angularly spaced indices disposed either equal or unequal distances from the center or centers of the disk or disks, as desired, and the lamp may be disposed above or in front of the disk. The same effect is obtained in this way as by slots in a disk or disks with a lamp disposed beneath or behind the disk or disks. In this connection Fig. 15 illustrates a single disk, designated as 19ᵇ, provided on its top or front face with a pair of indices 51ᵇ, 52ᵇ spaced both angularly and different distances from the center of the disk, and a lamp, designated as 39ᵇ, corresponding to the lamp 39 and located above or in front of the disk 19ᵇ.

Figure 16 illustrates another alternative form of the invention characterized by a disk or disks having angularly spaced slots and a lamp individual to each slot and rotatable with the disk or disks, as the case may be. Specifically, two relatively rotatable disks 19ᶜ, 20ᶜ are illustrated having therein slots 51ᶜ, 52ᶜ, respectively. Carried by the disk 19ᶜ, at the under or rear side thereof, is a lamp 39ᶜ which is alined with the slot 51ᶜ, while carried by the disk 20ᶜ at the under or rear side thereof, is a second lamp 39ᶜ which is alined with the slot 52ᶜ.

The two conductor rings 80 and 81 are suitably non-rotatably mounted coaxially with the disks 19ᶜ, 20ᶜ and provision is made in any suitable manner for connecting the high tension sides 76ᶜ of the two spark coils of a timer Dᶜ to said rings, respectively, as indicated at 74ᶜ, 74ᶜ. One of the lamps 39ᶜ is connected through a brush 82 with one of the rings 80 or 81 at any desired point and the other of said lamps 39ᶜ is connected through a brush 83 with the other of said rings. Alternatively, the rings 80 and 81 may be rotatable with the disks 19ᶜ, 20ᶜ; the lamps 39ᶜ may be connected in any suitable manner at any suitable points with said rings, respectively, and the high tension sides of the distributor coils may be connected with said rings by brushes, respectively. In either case, rotation of the cam of the timer with the disks 19ᶜ, 20ᶜ, results in flashing of first one and then the other of the lamps 39ᶜ responsive to actuation of the two breaker arms of the timer, respectively. Accordingly, images of the slot 51ᶜ are produced at angularly spaced points corresponding to breaking of one set of breaker points of the timer, and images of the slot 52ᶜ are produced at angularly spaced points corresponding to breaking of the other set of breaker points of the timer. Obviously, the angular relationship of the images of the slots 51ᶜ, 52ᶜ relative to each other is an indication of synchronism, or lack of synchronism, of the distributor.

Obviously, in lieu of the coupling means C, any other suitable means may be employed for coupling the shaft 16 to the cam shaft of a distributor to be tested.

Without further description it is thought that the features and advantages of the invention will be readily apparent to those skilled in the art, and, it will, of course, be understood that changes in the form, proportion and minor details of construction may be resorted to, without departing from the spirit of the invention and scope of the appended claims.

We claim:

1. Apparatus of the character described comprising a pair of opaque disks, one having a top recess accommodating the other and the two disks having their top surfaces disposed in a common plane, illuminating means to be connected with means for periodically flashing the same, means for unitarily rotating said disks in synchronism with the means for periodically flashing said illuminating means, said disks each having an indicator rendered effective to produce an image of itself upon a background constituted by the top surfaces of said disks by each flashing of said illuminating means, said disks being rotatably adjustable relative to each other to vary the angular relationship between the indicators on the respective disks, and means for fastening said disks together for unitary rotation in any rotatably adjusted position of said disks relative to each other, whereby there is indicated by the angular relationship to each other of the images of the respective indicators the sameness, or lack of sameness, of the intervals between successive flashings of the illuminating means.

2. Apparatus as set forth in claim 1 in which the illuminating means is disposed behind the disks and in which the indicators are in the form of slots in said disks.

3. Apparatus as set forth in claim 1 in which the illuminating means is disposed in front of the disks and in which the indicators are in the form of indices on the front surfaces of said disks.

4. Apparatus of the character described comprising a pair of disks one superimposed upon and carried by the other, the top surfaces of said disks being disposed in substantially a common horizontal plane, illuminating means to be connected with means for periodically flashing the same, means for unitarily rotating said disks in synchronism with the means for periodically flashing said illuminating means, said disks each having an indicator rendered effective to produce an image of itself upon a background constituted by the top surfaces of said disks by each flashing of said illuminating means, said disks being rotatably adjustable relative to each other to vary the angular relationship between the indicators on the respective disks, and means for fastening said disks together for unitary rotation in any rotatably adjusted position of said disks relative to each other, whereby there is indicated by the angular relationship to each other of the images of the respective indicators the sameness, or lack of sameness, of the intervals between successive flashings of the illuminating means.

5. Apparatus of the character described comprising a first disk, a second disk of smaller diameter than said first disk superimposed upon and carried by said first disk, the top surfaces of said disks being disposed in substantially a common plane, illuminating means to be connected with means for periodically flashing the same, means for unitarily rotating said disks in synchronism with the means for periodically flashing said illuminating means, said disks each having an indicator rendered effective to produce an image of itself upon a background constituted by the top surfaces of said disks by each flashing of said illuminating means, said indicators being spaced different distances from the centers of said disks, said disks being rotatably adjustable relative to each other to vary the angular relationship between the indicators on the respective disks, and means for fastening said disks together for unitary rotation in any rotatably adjusted position of said disks relative to each other, whereby there is indicated by the angular relationship to each other of the images of the respective indicators the sameness, or lack of sameness, of the intervals between successive flashings of the illuminating means.

CHARLES MOHNEN.
BASIL A. BELS.
BENJAMIN F. W. HEYER.